E. GREEN.
CHAIN TIGHTENING AND RELEASING DEVICE.
APPLICATION FILED APR. 9, 1920.
1,398,548. Patented Nov. 29, 1921.
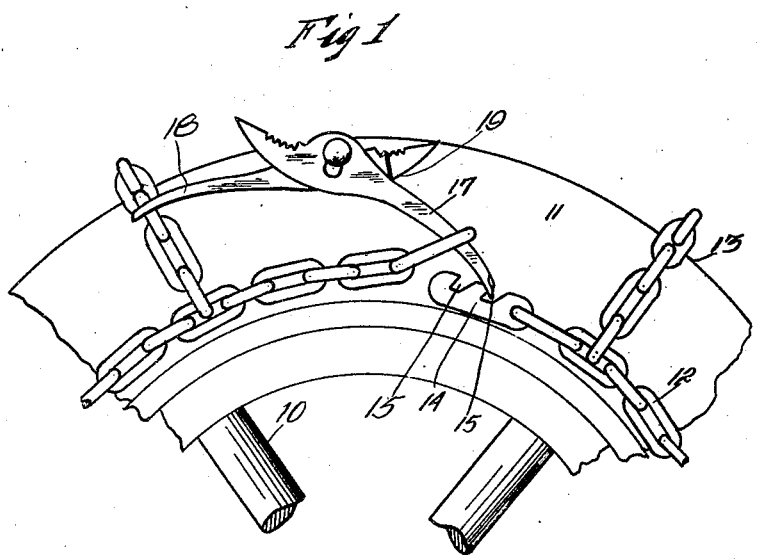
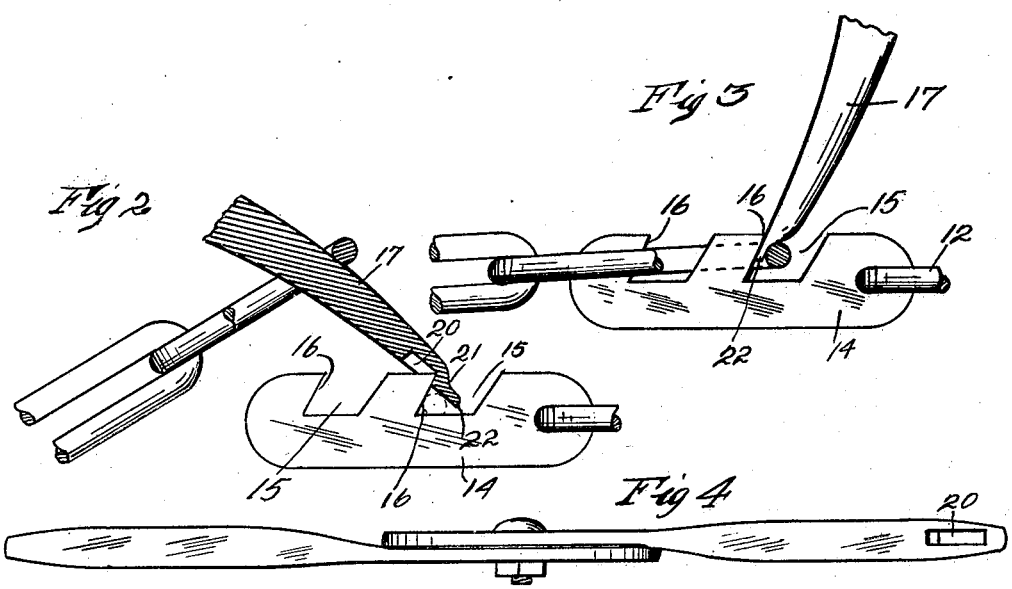

UNITED STATES PATENT OFFICE.

ELLYSON GREEN, OF WINTERSET, IOWA.

CHAIN TIGHTENING AND RELEASING DEVICE.

1,398,548.    Specification of Letters Patent.    Patented Nov. 29, 1921.

Application filed April 9, 1920. Serial No. 372,734.

*To all whom it may concern:*

Be it known that I, ELLYSON GREEN, a citizen of the United States, and a resident of Winterset, in the county of Madison and State of Iowa, have invented a certain new and useful Chain Tightening and Releasing Device, of which the following is a specification.

My invention relates to that class of chain tighteners designed for drawing tight and connecting together the link end of an antiskid tire chain with the hook member at the adjacent end of said chain.

My object is to provide a tool of simple, durable and inexpensive construction for the purpose of quickly and easily drawing the adjacent ends of an anti-skid tire chain together and for placing the link on one end of said chain in any one of the notches of the hook member of a chain, and also for the purpose of readily and quickly removing the link member from the hook member.

More specifically it is my object to provide a tool of this character, with which the link end of the chain may be placed in the particular notch of the hook member adjacent to which the tool is fulcrumed, whereby the link may be placed in the outer notch of the hook as well as any other, and further in this connection it is my object to provide a device of this character which may be used in connection with links that have openings in them of a size just large enough to receive the coacting hook member.

With these and other objects in view my invention consists in the construction, arrangement and combination of the various parts of the device, whereby the objects contemplated are attained, as hereinafter more fully set forth, pointed out in my claim and illustrated in the accompanying drawings, in which:

Figure 1 shows a side elevation of a part of a pneumatic tire having thereon shown part of a tire chain with my device in position for operation on the chain.

Fig. 2 shows a side elevation of the ends of the chain member and fastening device, the end link of the chain being shown in section, and the lever portion of my device being shown also in section.

Fig. 3 shows a side elevation of a portion of a chain with my device in position for releasing the chain from the fastening member.

Fig. 4 shows an inverted plan view of my improved device.

It is well-known with certain types of tire chains now commonly in use, considerable difficulty is experienced in drawing the ends of the side chains together and fastening them.

In the accompanying drawings I have used the reference numeral 10 to indicate generally a portion of a vehicle wheel on which is the pneumatic tire 11. I have shown a portion of an ordinary tire chain having the annular side chains 12 and the connecting cross chains 13. At one end of the side chain 12 is a fastening device 14 of ordinary type, from which the cover or locking member has been omitted. The fastening device 14 is provided with spaced notches 15, adjacent to which are the engaging shoulders 16.

My improved chain tightening and releasing device includes a lever member 17 which may be provided with a pivoted handle 18 having a shoulder 19 for limiting the pivotal movement of the handle 18 and lever 17 with relation to each other.

In one surface of the lever 17 near one end thereof is provided a recess 20, clearly shown in Fig. 2, spaced slightly from the extreme end of the lever. On the opposite side of the lever 19 and slightly nearer the extreme end than the recess 20 is a shoulder 21, beyond which is a reduced end portion 22 of the lever.

In bringing the ends of the chain 12 together, for causing one of the links of the chain to enter one of the notches 15, the lever 17 is inserted through the desired link as illustrated, for instance, in Figs. 1 and 2, and is brought to position where one of the shoulders 16 is received in the recess 20.

When the parts are in the position shown in Figs. 1 and 2, the lever may be swung over to the right, for forcing the link toward the locking device 14 and into the desired notch 15. For the sake of clearness I have omitted from the drawings the ordinary locking device by which the link is held in place after having once been assembled there.

For getting the advantage of greater leverage, the handle 18 may be extended to its position shown in Fig. 1, with the shoulder 19 in engagement with the lever 17 when desired.

When it is desired to release the chain links from the fastening device 14, the reduced end portion 22 of the lever is forced between the links of the chain and the shoulder 16 as illustrated in Fig. 3. The lever 17 is then swung to the left against the shoulder 16 as a fulcrum, and the link is forced away from said shoulder and then out of the notch 15.

It will be noted that by reducing the end portion 22 of the tool, and by forming the notch 20 close to the end of the tool, the tool may be inserted through a link which has an opening just wide enough to receive the hook member, because no parts of the tool project down along the sides of the hook member. With my improved tool, therefore, the operator may place the tool in position with its notch 20 resting against the shoulder 16 of the particular notch 15 in which it is desired to place the end of the link. Then when the lever is moved to position for drawing the link and hook together, the link need not be drawn to any great extent past the shoulder 16 which forms the fulcrum, and it will slide readily into the notch 15 adjoining the particular shoulder 16 which serves as the fulcrum. For this purpose it is necessary that the distance between the notch 20 and the lower end of the tool is such that when the device is in the position shown in Fig. 3, the lower end of the tool will not touch the bottom of the notch 15.

In releasing the chain it is only necessary to force the reduced lower end of the tool between the link and the shoulder 16, and then use of the tool as a lever to pry the link upwardly and outwardly from the notch, using the shoulder 16 in the notch 20 as a fulcrum.

I desire to cover by my claims such modifications in structure or use of mechanical equivalents, as may be reasonably included within their scope.

I claim as my invention:

A device for attaching and releasing the link member at one end of an anti-skid tire chain from the notched hook member at the other end of an anti-skid chain, comprising a lever having on one of its sides, slightly spaced apart from its ends, a notch or recess having four sides and designed to receive in said notch or recess any one of the hooks of a notched hook member on an antiskid chain and to hold said lever against movement laterally and longitudinally relative to said member when being used, the side of said lever opposite from the side in which the notch is formed being tapered down to a narrow edge at the end, thereby forming a wedge shaped member that may be freely inserted between a link and a hook of an anti-skid chain for removing the link from the hook, and whereby the link may readily slide in position in the notch of the notched hook member, when attaching the link to the hook member and when the said recess on the other side of the lever has the hook member inserted in it, for the purposes stated.

Des Moines, Iowa, March 11, 1920.

ELLYSON GREEN.